United States Patent
Lewis et al.

(10) Patent No.: US 10,333,871 B1
(45) Date of Patent: Jun. 25, 2019

(54) LOGGED-OUT CONVERSATION INVITATIONS

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 443 days.

(21) Appl. No.: 14/666,135

(22) Filed: Mar. 23, 2015

(51) Int. Cl.
*H04L 12/58* (2006.01)

(52) U.S. Cl.
CPC .................................. *H04L 51/046* (2013.01)

(58) Field of Classification Search
None
See application file for complete search history.

(56) References Cited

U.S. PATENT DOCUMENTS

| | | | | |
|---|---|---|---|---|
| 2013/0191762 A1* | 7/2013 | Rajagopalan | ....... | H04L 12/1818 715/753 |
| 2015/0148093 A1* | 5/2015 | Huang | ............. | H04W 52/0225 455/522 |
| 2015/0180980 A1* | 6/2015 | Welinder | ............. | H04L 65/403 715/758 |
| 2016/0021115 A1* | 1/2016 | Adams | .................. | H04L 63/102 726/6 |
| 2016/0179855 A1* | 6/2016 | Roman | .................. | H04L 63/08 707/744 |
| 2017/0070358 A1* | 3/2017 | Svendsen | ............ | H04L 12/1822 |

* cited by examiner

*Primary Examiner* — Kevin T Bates
*Assistant Examiner* — Lesa M Kennedy
(74) *Attorney, Agent, or Firm* — Lowenstein Sandler LLP

(57) ABSTRACT

Implementations disclose logged-out conversation invitations. A method includes receiving an indication of a content item to be shared by a sharing user with one or more recipient users, wherein the sharing user is not logged-in to a content sharing platform maintaining the content item, generating a token to represent a combination of the content item, information corresponding to a user device of the sharing user, information corresponding to one or more user devices of the one or more recipient users, and a conversation associated with the content item, and sending a link comprising the token to the one or more user devices of the one or more recipient users, the link providing access to the shared content item and an invitation to join the conversation by signing-in to the content sharing platform.

19 Claims, 9 Drawing Sheets

400

```
┌─────────────────────────────────────────────────────────────────────┐
│ Receive an indication of a content item of a content sharing        │
│ platform to be shared by a sharing user with one or more recipient  │
│ users                                                               │
│                                                                 410 │
└─────────────────────────────────────────────────────────────────────┘
                                  │
                                  ▼
┌─────────────────────────────────────────────────────────────────────┐
│ Determine information corresponding to a user device of the sharing │
│ user                                                                │
│                                                                 420 │
└─────────────────────────────────────────────────────────────────────┘
                                  │
                                  ▼
┌─────────────────────────────────────────────────────────────────────┐
│ Determine information corresponding to user devices of the recipient│
│ users                                                               │
│                                                                 430 │
└─────────────────────────────────────────────────────────────────────┘
                                  │
                                  ▼
┌─────────────────────────────────────────────────────────────────────┐
│ Generate a token to represent a combination of the content item, the│
│ information corresponding to the user device of the sharing user,   │
│ the information corresponding to the user devices of the recipient  │
│ users, and a conversation associated with the shared content item   │
│                                                                 440 │
└─────────────────────────────────────────────────────────────────────┘
                                  │
                                  ▼
┌─────────────────────────────────────────────────────────────────────┐
│ Provide shared content item and invitation to join the conversation │
│ to the recipient users, where the one or more recipient users can   │
│ join the conversation by signing-in or signing-up for a public      │
│ identity on the content sharing platform                            │
│                                                                 450 │
└─────────────────────────────────────────────────────────────────────┘
```

```
┌─────────────────────────────────────────────────────────────────────┐
│ Receive indication that a recipient user joined a conversation       │
│ pertaining to a shared content item shared by a sharing user that    │
│ is not logged into a content sharing platform maintaining the        │
│ shared content item                                                  │
│                                                                  510 │
└─────────────────────────────────────────────────────────────────────┘
                                    │
                                    ▼
┌─────────────────────────────────────────────────────────────────────┐
│ Access a token associated with the conversation                      │
│                                                                  520 │
└─────────────────────────────────────────────────────────────────────┘
                                    │
                                    ▼
┌─────────────────────────────────────────────────────────────────────┐
│ Determine information corresponding to a user device of the sharing  │
│ user from the token                                                  │
│                                                                  530 │
└─────────────────────────────────────────────────────────────────────┘
                                    │
                                    ▼
┌─────────────────────────────────────────────────────────────────────┐
│ Determine, using the information corresponding to the user device    │
│ of the sharing user, a communication path to contact the user        │
│ device of the sharing user                                           │
│                                                                  540 │
└─────────────────────────────────────────────────────────────────────┘
                                    │
                                    ▼
┌─────────────────────────────────────────────────────────────────────┐
│ Provide, via the determined communication path a notification to     │
│ the user device of the sharing user, the notification informing the  │
│ sharing user that the recipient user joined the conversation about   │
│ the shared content item and inviting the sharing user to join the    │
│ conversation                                                         │
│                                                                  550 │
└─────────────────────────────────────────────────────────────────────┘
                                    │
                                    ▼
┌─────────────────────────────────────────────────────────────────────┐
│ Providing the user device of the sharing user access to the          │
│ conversation when the sharing user accepts the invitation to join    │
│ the conversation by signing in or signing up for a public profile    │
│ on the content sharing platform                                      │
│                                                                  560 │
└─────────────────────────────────────────────────────────────────────┘
```

FIG. 5

LOGGED-OUT CONVERSATION INVITATIONS

TECHNICAL FIELD

This disclosure relates to the field of content sharing platforms and, in particular, to logged-out conversation invitations.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such viewable and shareable media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers, network-connected televisions) to use, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving an indication of a content item to be shared by a sharing user with one or more recipient users, wherein the sharing user is not logged-in to a content sharing platform maintaining the content item, generating a token to represent a combination of the content item, information corresponding to a user device of the sharing user, information corresponding to one or more user devices of the one or more recipient users, and a conversation associated with the content item, and sending a link comprising the token to the one or more user devices of the one or more recipient users, the link providing access to the shared content item and an invitation to join the conversation by signing-in to the content sharing platform.

In one implementation, signing-in to the content sharing platform includes the one or more recipient users associating with a public identity on the content sharing platform. Furthermore, comments corresponding to the conversation may be hidden from the one or more recipient users who are not logged-in to the content sharing platform. In addition, the information corresponding to the user device of the sharing user may include a device identifier (ID) of the user device of the sharing user or may include a visitor ID of the user device of the sharing user.

In a further implementation, the method includes receiving an indication that a recipient user of the one or more recipient user joined the conversation, determining the information corresponding to the user device of the sharing user from the token corresponding to the conversation, providing, via communication path determined from the information corresponding to the user device of the sharing user, a notification to the user device of the sharing user that the recipient user joined the conversation and another invitation to the sharing user to join the conversation, and providing, to the user device of the sharing user, access to the conversation when another indication is received that the sharing user accepted the another invitation to join the conversation via signing-in to the content sharing platform.

In some implementations, the comments of the recipient user in the conversation are hidden from the sharing user when the sharing user is not logged-in to the content sharing platform. In addition, a comment of the sharing user corresponding to the shared content item is provided with the shared content item when initially shared with the one or more recipient users. Furthermore, the shared content item and the invitation to join the conversation may be provided to the one or more recipients via at least one of Short Message Service (SMS), email message, first-party network of the content sharing platform, or a third-party social network.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

FIG. 4 is a flow diagram illustrating a method for initiating a logged-out conversation on a content sharing platform, according to an implementation.

FIG. 5 is a flow diagram illustrating a method for generating a conversation invitation for a logged-out sharing user of a content sharing platform, according to an implementation.

DETAILED DESCRIPTION

Aspects and implementations of the disclosure are directed to logged-out conversation invitations. Implementations are described for a content sharing conversation system that enables logged-out users to share a content item and start a conversation around that shared content item without logging-in, creating an identity or verifying contact information. A logged-out user may include a user that interacts with the content sharing platform without providing an identity that is publicly-viewable by other users of the content sharing platform. In some implementations, an anonymous user is considered a logged-out user.

Implementations of the disclosure may engage the logged-out user to sign in to or sign up for (e.g., create a public identity) the content sharing platform by requesting the logged-out user to join the conversation in order to view replies and/or comments provided by recipients of an original share of the content item (e.g., initial share of content item from the logged-out user to the recipient users). A unique token may be generated and utilized by the content sharing conversation system as part of the original share of the content item. The unique token may be used to associate the original sharing user and the recipient users with the shared content item and the associated conversation, as well as to direct communications and invitations between users participating in the conversation.

Prior solutions typically do not allow any social component to be applied to logged-out users. From the content sharing platform point-of-view, logged-out users do not have connections with other users (e.g., friends), cannot interact with other logged-in users, and cannot make changes (e.g., enter or modify data) within a web browser or an application (e.g., a mobile application) associated with the content sharing platform. This state is even more pronounced in chat applications. A logged-out user cannot chat with users that are logged-in and the logged-in users cannot chat with users that are logged-out. This means that the logged-out user should first sign in or sign up for the application before the option of a conversation is even available.

Implementations of the disclosure overcome the limitations of the prior solutions for logged-out users by enabling logged-out users to start an in-application conversation without logging-in, creating an identity or verifying contact information (e.g., phone number). The logged-out user can be encouraged to sign-in to further reply to the conversation, but the specific conversation had already been initiated by the logged-out user.

Implementations of the disclosure often reference videos for simplicity and brevity. However, the teachings of the disclosure are applied to media items generally and can be applied to various types of content or media items, including for example, video, audio, text, images, program instructions, etc.

Figure 1:
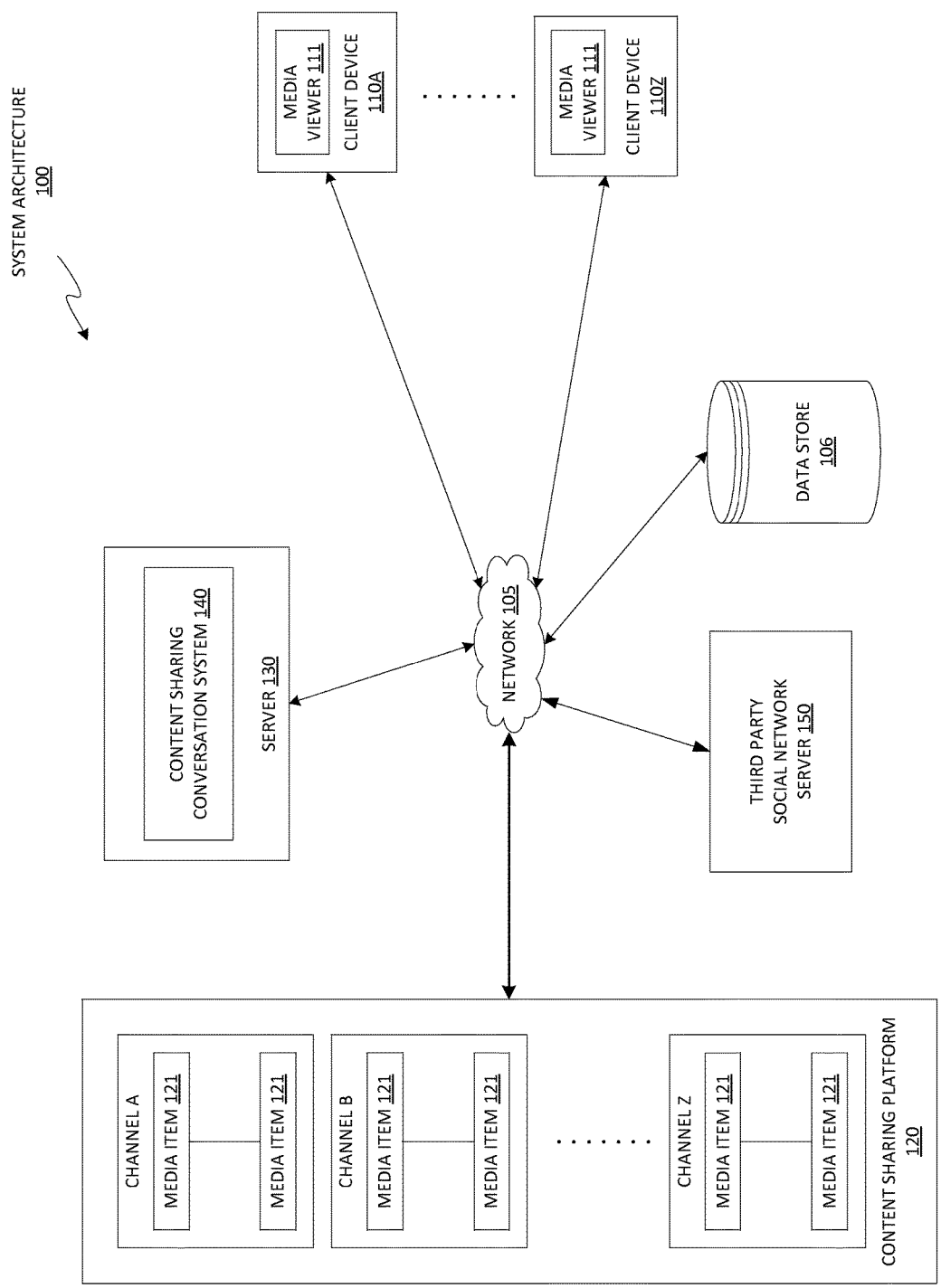
FIG. 1 is a block diagram illustrating an exemplary network architecture in which implementations of the present disclosure may be implemented.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a content sharing conversation system 140. In one implementation, the content sharing conversation system 140 enables logged-out users to share a content item and start a conversation around that shared content item without logging-in, creating an identity or verifying contact information. A logged-out user may include a user that interacts with the content sharing platform without providing an identity that is publicly-viewable by other users of the content sharing platform. In some implementations, an anonymous user is considered a logged-out user.

Implementations of the disclosure may engage the logged-out user to sign in to or sign up for (e.g., create a public identity) the content sharing platform by requesting the logged-out user to join the conversation in order to view replies and/or comments provided by recipient users of the original share of the content item. A unique token may be generated and utilized by the content sharing conversation system 140 as part of the original share of the content item. The unique token may be used to associate the original sharer and the recipients with the shared content item and associated conversation, as well as to direct communications and invitations between users participating in the conversation.

In some implementations, content sharing conversation system 140 of server 130 may interact with content sharing platform 120 and/or with other third party social network servers 150 to provide implementations of the disclosure. Further description of the content sharing conversation system 140 and its specific functions is described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
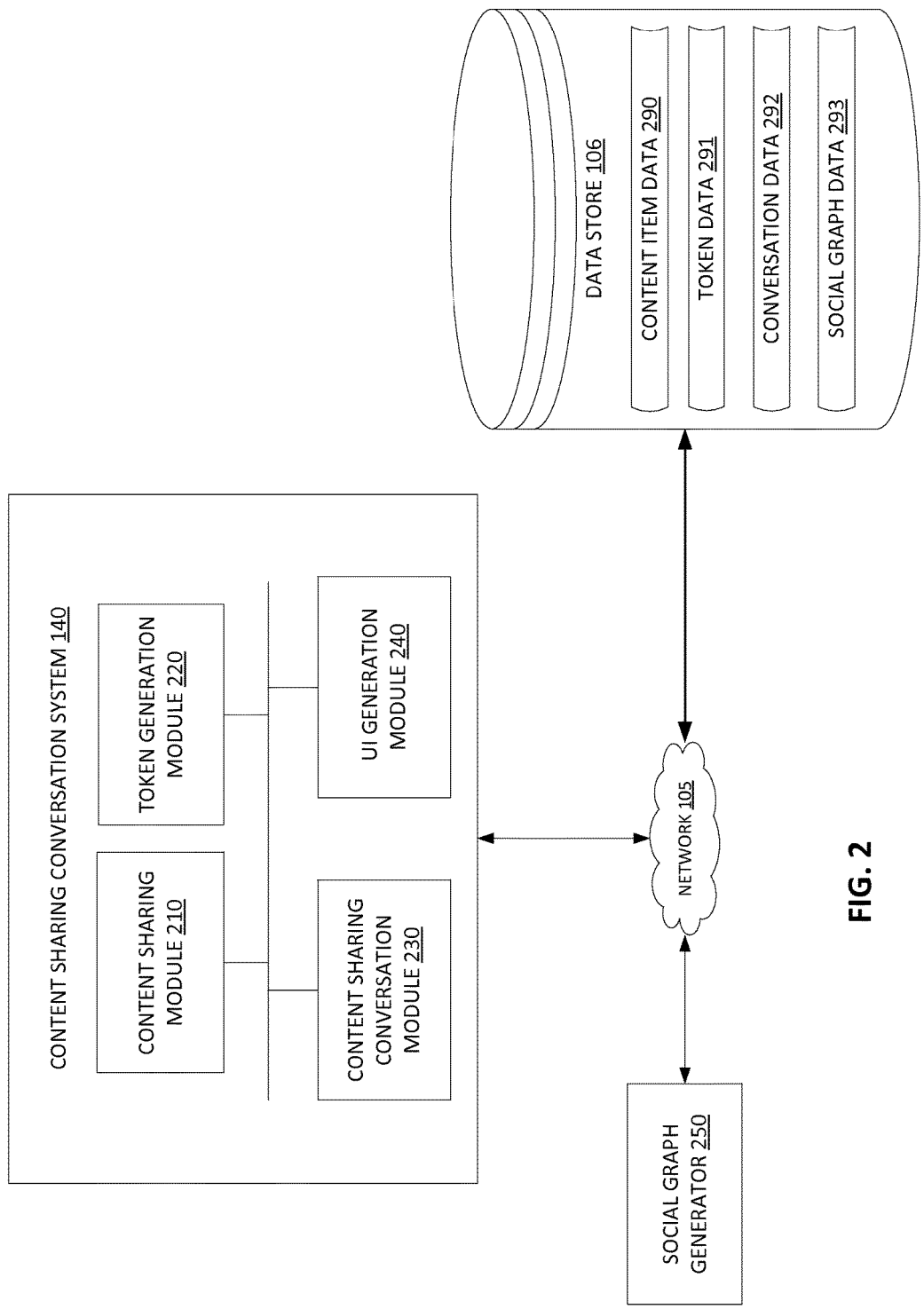
FIG. 2 is a block diagram illustrating a content sharing conversation system in accordance with one implementation of the disclosure, according to an implementation.

FIG. 2 is a block diagram illustrating a content sharing conversation system 140 in accordance with one implementation of the disclosure. As discussed above, the content sharing conversation system 140 may interact with a single social network, or may be utilized among multiple social networks (e.g., provided as a service of a content sharing platform that is utilized by other third party social networks). In one implementation, the content sharing conversation system 140 includes a content sharing module 210, a token generation module 220, a content sharing conversation module 230, and a UI generation module 240. More or less components may be included in the content sharing conversation system 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The content sharing conversation system 140 is communicatively coupled to the data store 106. For example, the content sharing conversation system 140 may be coupled to the data store 106 via a network (e.g., via network 105 as illustrated in FIG. 1). In another example, the content sharing conversation system 140 may be coupled directly to a server where the content sharing conversation system 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, token data 291, conversation data 292, and social graph data 293.

As discussed above, the content sharing conversation system 140 enables logged-out users to share a content item and start a conversation around that shared content item without logging-in, creating an identity or verifying contact information. The content sharing module 210 may enable a user, such as a logged-out user or a logged-in user, to start a conversation regarding shared content item using token invites. For purposes of the following description, the user initiating a content item share and associated conversation is discussed as being a logged-out user. However, in other implementations, a logged-in user may initiate a content item share and associated conversation, which, in turn, may engage another logged-out user to sign-in or sign-up to participant in the conversation. Furthermore, the following description discusses the content item sharing and associated conversation around a content item in a mobile device context using a native application of the content sharing platform executing on the mobile device. However, other environments may support the content item sharing and conversations discussed herein, such as via a web browser environment of a desktop computing device.

The content sharing module 210 may provide a user interface (UI), such as a graphical UI (GUI), that enables a user, referred to herein as the "sharing user", to share a content item of the content sharing platform with one or more other users and construct a conversation around that shared content item. The sharing user may identify a content item to share (e.g., via browsing or searching of content items of the content sharing platform) with one or more other users. The content sharing module 210 may provide the UI to a user device of the sharing user, where the UI enables the sharing user to share the content item via private sharing through a first-party network of the content sharing platform, via other networks and/or platforms than the content sharing platform, and/or with individual contacts of the user via Short Message Service (SMS) or any other telecommunication protocol.

Figure 3A:
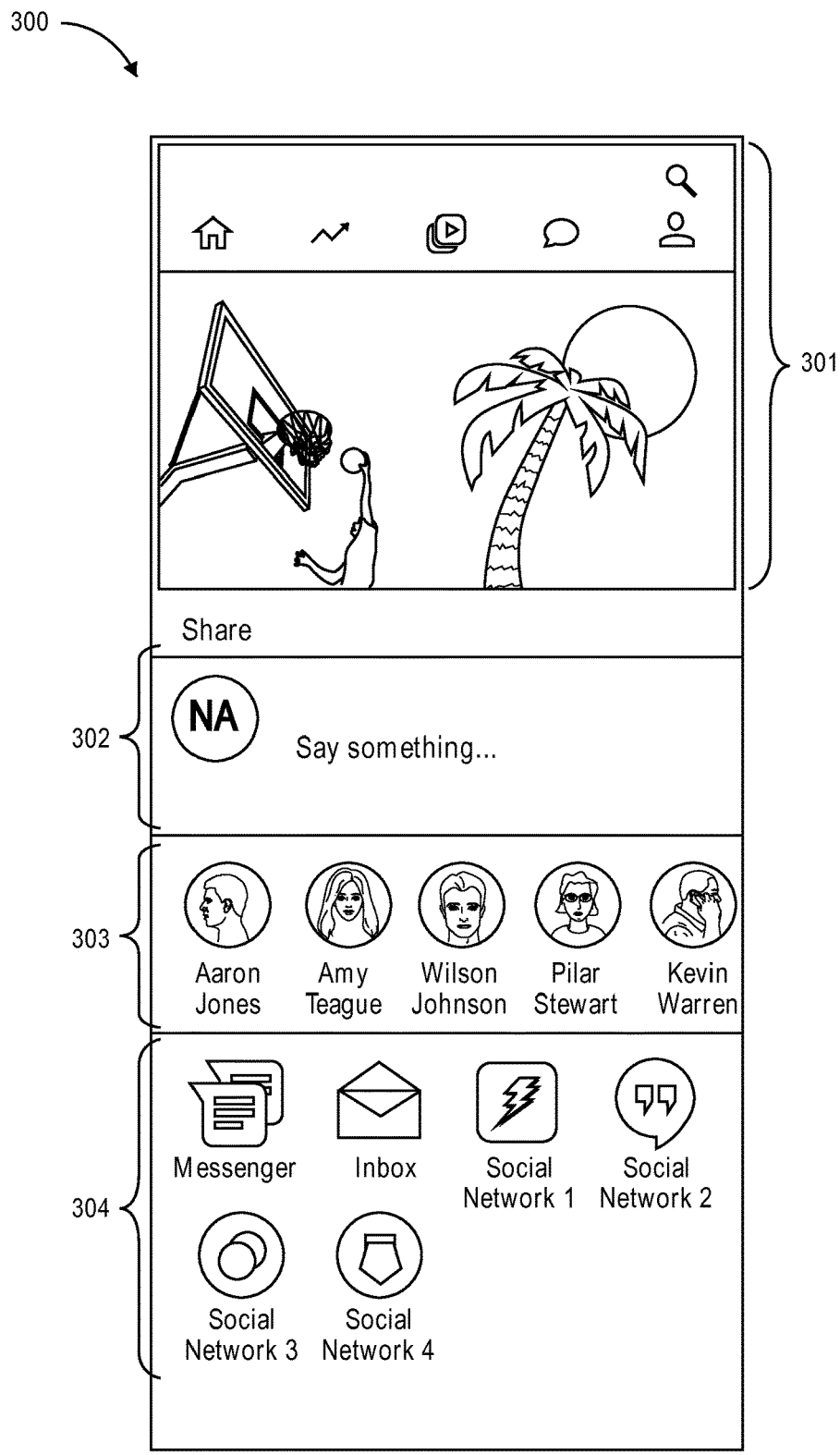
FIGS. 3A through 3D illustrate example screenshots of logged-out conversation invitations according to implementations of the disclosure

FIG. 3A is a screenshot of a graphical user interface (GUI) of a share content UI 300 providing sharing options for a content item to a logged-out sharing user. In one implementation, the content sharing module 210 works in conjunction with the UI generation module 240 to provide data to a user device to render the share content UI 300. Share content UI 300 may include a menu and content item section 301 showing a content item, such as a video, that the sharing user selected for sharing. When the sharing user selected a sharing option for the content item, share sections 302, 303, 304 may slide up from the bottom of the share content UI 300.

Section 302 may include a text entry area for the sharing user to type in a comment regarding the shared content item. Section 303 may include individual users curated from the user device (e.g., via a list of contacts stored on the user device) that the sharing user may select for sharing. Section 304 may include other sharing environments and platforms that the sharing user may select for sharing the content item. For example, the other sharing environment and platforms may include a first-party network of the content sharing platform, third-party social networks separate from the content sharing platform, email, SMS, and so on.

Referring back to FIG. 2, in one implementation, the content sharing module 210 may work in conjunction with a native application of the content sharing platform executing on the user device of the sharing user to determine which applications on the user device are capable of receiving a sharing action from the native application. For example, applications may be installed on the user device corresponding to one or more third-party social networks with which the sharing user might share a content item from the content sharing platform. In one implementation, the native application utilizes an operating system (OS)-level call to identify the other applications on the user device for sharing, as well as the particular calls used by those identified applications to invoke the sharing action from the native application.

The content sharing module 210 may receive, via the UI, an indication of a selection by the sharing user of one or more users with which to share the content item. The users selected by the sharing user may be referred to herein as "recipient users." The content sharing module 210 may then create a link, such as a Uniform Resource Locator (URL), with a unique token to identify the shared content item and a conversation associated with the shared content item. A token may refer to an object that represents a unique identifier of an interaction. The token generation module 220 may be responsible for generating the unique token for the conversation. The token may include, but is not limited to, information of the shared content item, information of the sharing user, and/or information of the recipient users. In one implementation, data corresponding to the generated token may be stored as token data 291 in data store 106.

The information of the shared content item may be an identifier (ID) corresponding to the content item that is stored in content item data 290 and can be used to look up and access the content item. The information of the sharing user may include a device ID or a visitor ID associated with the user device that originating the sharing request. In other implementations, the information of the sharing user may be a cookie associated with a browsing session that originated the sharing request. If the sharing user is logged-in, then the information of the sharing user may include a user ID (UID) associated with a profile of the sharing user on the content sharing platform. The information of the recipient users may include, but is not limited to, content sharing platform UID, an email address, a phone number, and so on.

The content sharing module 210 may provide the generated link to the selected recipient users via, for example, the sharing action invoked via specialized calls to other application, via sharing through the first-party network of the content sharing platform, and/or via direct sharing such as SMS, email, etc. For example, the generated link may be provided as a text string via the invoked sharing action. The generated link may act as an invitation to the recipient users to view the shared content item and join a conversation associated with the shared content item.

The content sharing conversation module 230 may provide data for a conversation UI that enables a conversation to occur around the shared content item between the sharing user and the recipient user(s). The content sharing conversation module 230 may receive an indication that the recipient user is requesting to access the shared content item and conversation invitation. The content sharing conversation module 230 may extract the token ID from the received indication in order to identity the shared content item and the participating users (e.g., sharing user and other recipient users) that are part of a conversation associated with the shared content item. Token data 291 of data store 106 may be accessed to identify this information. Content sharing conversation module 230 may then create and/or access a conversation space for the participating users that is represented by the conversation UI. In one implementation, data corresponding to the conversation space and conversation UI may be stored as conversation data 292 in data store 106.

When a user device of a recipient user receives and accesses the link, the conversation UI may be provided by the content sharing conversation module 230 via a native application executing on the recipient user device. In other implementations, if the link does not open in the native application, but rather opens in a web browser environment of the recipient user device, then the browser page opened via the link may direct the recipient user to the native application in order to view the conversation UI.

The conversation UI enables the recipient user to view the shared content item and provides an ability to respond to the other participant users in the conversation. If the recipient user is not already logged-in or signed-up for a public identity with the content sharing platform, the content sharing conversation module 230 encourages, via the conversation UI, the recipient user to sign-in or sign-up in order to view comments of one or more of the participant users in the conversation (also referred to as "joining the conversation"). In other implementation, the recipient user may be able to view the conversation even though he or she is not signed-in, but may not be able to participate (reply or comment) in the conversation.

Figure 3B:
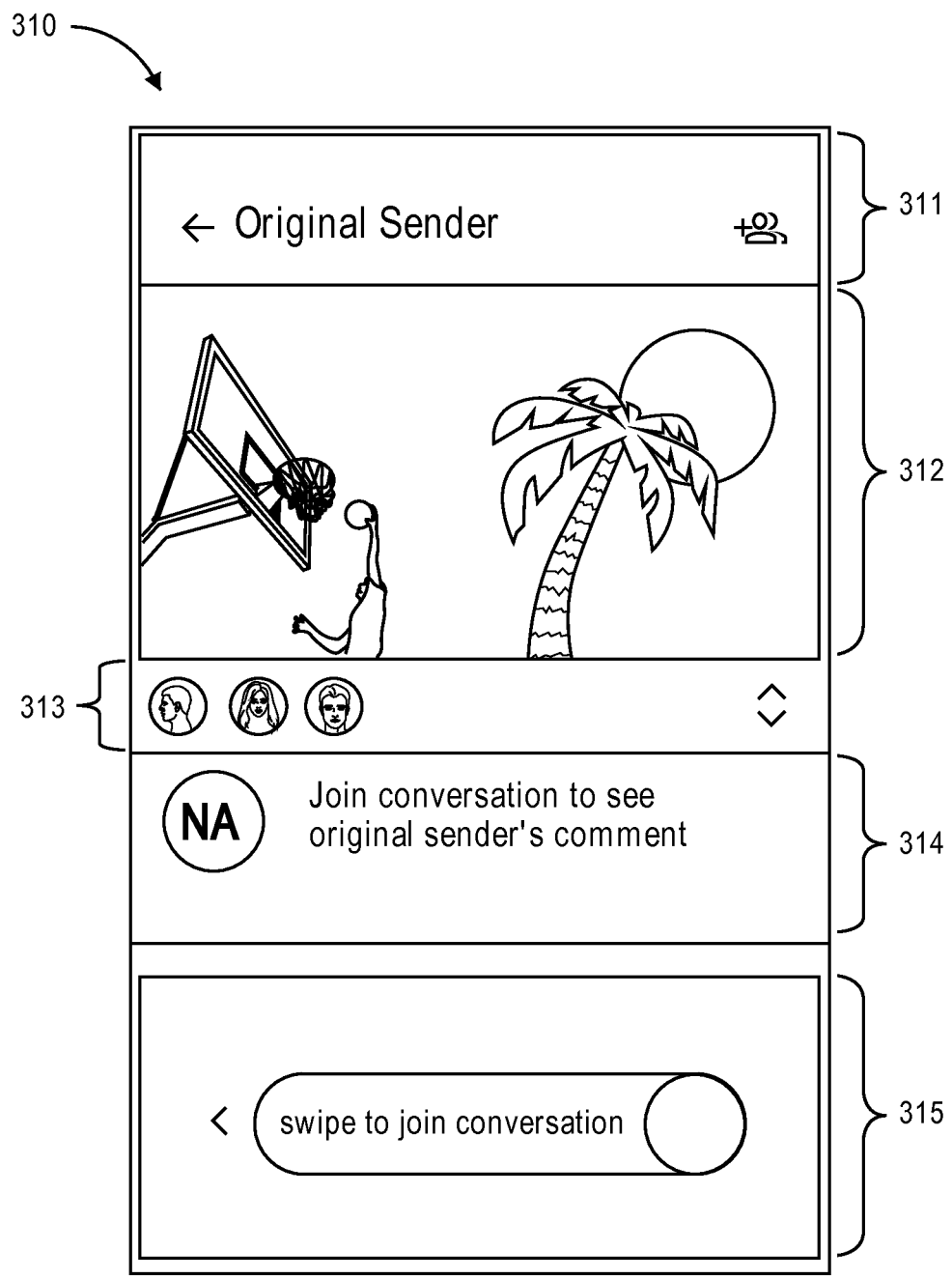

FIG. 3B is a screenshot of a GUI of a join conversation UI 310 illustrating a shared content item and an invitation to participate in a conversation associated with the shared content item. In one implementation, the content sharing conversation module 230 works in conjunction with the UI generation module 240 to provide data to a user device to render the join conversation UI 310. Join conversation UI 310 includes an identifier section 311 providing a name or other identifier of the sharing user that originated a shared content item and conversation. Section 312 is a content item player that enables playback and/or viewing of a shared content item. Section 313 identifies all participant users in a shared content item conversation. Section 314 is a conversation space displaying the comments of participating users in the conversation associated with a shared content item. As shown in FIG. 3B, the sharing user of the content item is a logged-out user, and as such, does not have a public profile or identity to display. In this case, the sharing user may be identified as "Original Sender" or any other generic identifier, or may not be identified at all.

When the recipient user is not logged-in to the content sharing platform, implementations of the disclosure may hide the comments associated with the conversation until the recipient user signs-in or signs-up for a public profile on the content sharing platform. As such, section 314 hides the comment from the sharing user and in its place displays generic text such as "Join the conversation to see original sender's comment" or something similar. This provides an incentive to the recipient user to sign-in or sign-up to the content sharing platform in order to view comments in a conversation. Section 315 provides an action area that allows the recipient user to sign-in or sign-up for the content sharing platform. When the recipient user takes an affirmative action indicated in section 315 (e.g., swiping the bar across the screen in the indicated direction), the recipient user may be directed through a sign-in or enrollment process for the content sharing platform.

In some implementations, a recipient user is prompted to join the conversation prior to trying to type or enter any text (e.g., a reply or comment). In other implementations, the recipient user is prompted to join the conversation after he or she has tried to type and enter text as a comment or reply to the conversation. The recipient user may join the conversation by performing an action (e.g., swiping a bar, selecting a button, etc.) that indicates the recipient user's acceptance to join the conversation. Joining a conversation may refer to the act of a user (sharing user, recipient user, or any other participant user) becoming a co-participant with all other users in the conversation. A user who joins a conversation may be notified of any actions performed by other participant users in the conversation. In some implementations, conversations may be generated on a one-to-one basis between a sharing user and a recipient user. In this case, when a sharing user shares a content item with multiple recipient users, the content sharing conversation module 230 may generate unique conversations between the sharing user and each recipient user, so that each recipient user is not part of conversations with other invited recipient users.

In one implementation, the recipient user is not shown the name or identifying information of the sharing user on the conversation UI. This may be the case even when the recipient user may have accessed the conversation UI directly from an SMS application that would have included the sharing user's name and phone number.

Figure 3C:
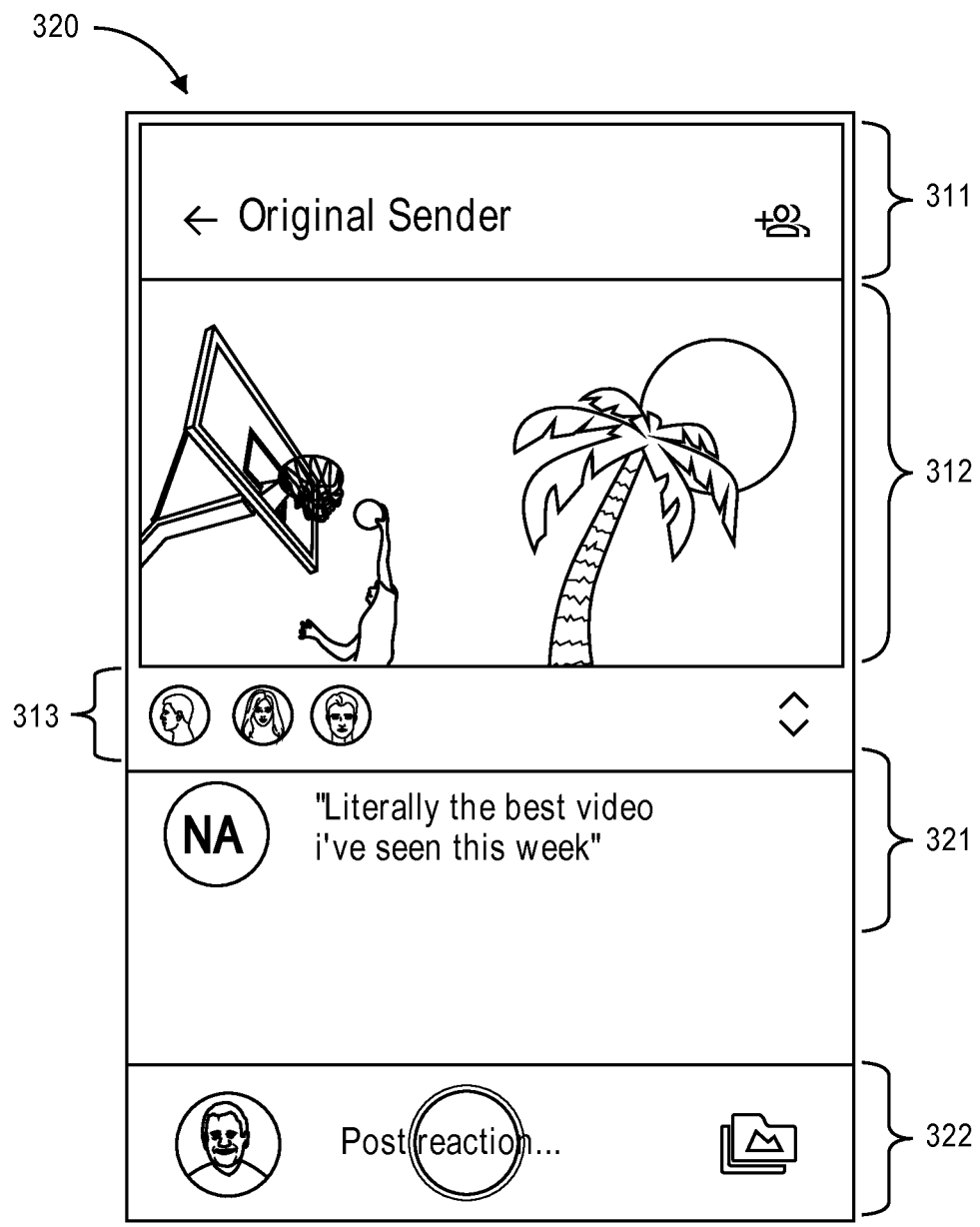

Referring back to FIG. 2, after a recipient user signs-in or signs-up for the content sharing platform, the content sharing conversation module 230 may provide a conversation UI that allows the recipient user to participate in the conversation associated with the shared content item. FIG. 3C is a screenshot of a conversation UI 320 illustrating a shared content item and a conversation associated with the shared content item. In one implementation, the content sharing conversation module 230 works in conjunction with the UI generation module 240 to provide data to a user device to render the conversation UI 320. Similar to join conversation UI 310 described with respect to FIG. 3B, conversation UI 320 includes an identifier section 311 providing a name or other identifier of the sharing user that originated a shared content item and conversation, a content item player section 312 that enables playback and/or viewing of a shared content item, and a participant user section 313 that identifies all participant users in a shared content item conversation.

The conversation page UI 320 also includes a comments section 321 that is a conversation space displaying all of the comments and/or actions of the participating users in association with the shared content item and corresponding conversation. As shown in FIG. 3C, when the recipient user is signed-in to the content sharing platform, the actual comment text of the conversation is viewable. A comment submission section 322 includes a text entry box where the recipient user can type in and submit text relating to the shared content item for sharing with the other participant users in the conversation.

Referring back to FIG. 2, when the content sharing conversation module 230 receives an indication that a recipient user joins the conversation, the content sharing conversation module 230 notifies the sharing user that the recipient user has joined the conversation and/or otherwise sent feedback to the conversation. In one implementation, the content sharing conversation module 230 accesses information of the sharing user maintained in the token corresponding to the conversation (e.g., in token data 291). The information may include a device ID, a visitor ID, or a cookie corresponding to a user device of the sharing user. The content sharing conversation module 230 can utilize this information to determine where to direct the notification to the sharing user.

In one implementation, the notification may be a mobile notification directing the sharing user to a conversation UI in a native application of the user device of the sharing user. In other implementations, the notification may be a pop-up notification in a web browser application directing the sharing user to a conversation UI. The conversation UI may be similar to the conversation UI sent to the recipient user to notify the recipient user of the shared content item and conversation and provide the recipient user an opportunity to join the conversation.

Figure 3D:
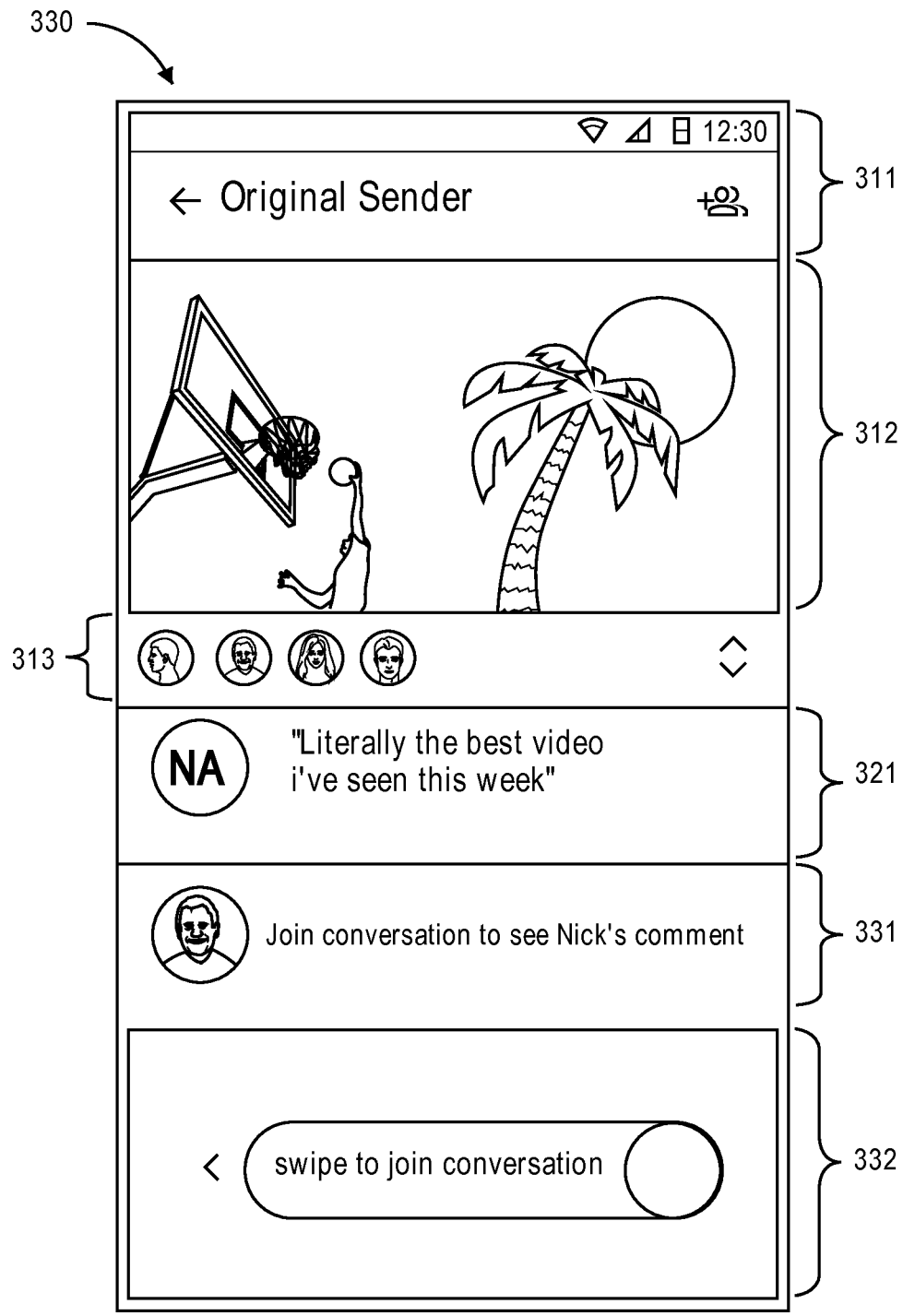

FIG. 3D is a screenshot of another join conversation UI 330 illustrating a notification that a recipient user has joined a conversation corresponding to a content item shared by the sharing user, as well as an invitation to participate in the conversation. In one implementation, the content sharing conversation module 230 works in conjunction with the UI generation module 240 to provide data to a user device to render the join conversation UI 330. Join conversation UI 330 is similar to join conversation UI 310 of FIG. 3B in that it includes an identifier section 311 providing a name or other identifier of the sharing user that originated a shared content item and conversation, a content item player section 312 that enables playback and/or viewing of a shared content item, and a participant user section 313 that identifies all participant users in a shared content item conversation.

In addition, join conversation UI 330 provided to the sharing user includes a comments section 321 that shows the original comment of the sharing user. Recipient user comments are shown in section 331 with the actual comment text hidden and generic text displayed in order to encourage the sharing user to sign-in or sign-up to view the comment text. For example, the generic text in section 331 may inform the sharing user that a particular recipient user has provided a comment and request the sharing user to sign-in or sign-up to view the comment (e.g., "Join the conversation to see Nick's comment"). Section 332 provides an action area that allows the sharing user to sign-in or sign-up for the content sharing platform. When the sharing user performs an affirmative action indicated in section 332 (e.g., swiping the bar across the screen in the indicated direction), the sharing user may be directed through a sign-in or enrollment process for the content sharing platform. Once signed-in, a user device of the sharing user may then be directed to the conversation UI, such as conversation UI 320 described with respect to FIG. 3C.

Implementations of the disclosure may engage users, such as the logged-out sharing user and any logged-out recipient users to sign-in to or sign-up for (e.g., create a public identity) the content sharing platform by requesting these users to join the conversation in order to view replies and/or comments provided by participating users in the conversation. In some implementations, a user may have a lightweight account with the content sharing platform, where the user is technically signed-in to the content sharing platform but does not have a publicly-discoverable identity on the content sharing platform. In this case, the user may be requested to join the conversation by upgrading his or her account to have a publicly-discoverable profile.

As additional users are encouraged to sign-in and/or sign-up for the content sharing platform, implementations of the disclosure enable the content sharing platform to grow and build a social graph of users. A social graph refers to a graph (e.g., representation of a set of objects where some pairs of objects are connected by links) that depicts relationships between users. In one implementation, the content sharing conversation system 140 may work in conjunction with a social graph generator 250 to build and maintain the social graph for the content sharing platform. Social graph generator 250 may be part of a server that is separate from or part of the content sharing platform.

FIG. 4 is a flow diagram illustrating a method 400 for initiating a logged-out conversation on a content sharing platform according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by content sharing conversation system 140 as shown in FIGS. 1 and 2.

Method 400 begins at block 410 when an indication of a content item to be shared by a sharing user is received. The content item may be maintained on a content sharing platform. In addition, the indication may include identification of one or more recipient users with which to share the content item. In one implementation, the sharing user is not logged-in to the content sharing platform. At block 420, information corresponding to a user device of the sharing user is determined. In one implementation, the information may include a device ID or a visitor ID associated with the user device.

At block 430, information corresponding to the user device of the recipient user is determined. In one implementation, the information may be included as part of the original indication received at block 410 (e.g., a SMS phone number, an email address, an UID of the recipient user on a social network, etc.). At block 440, a token is generated to represent the combination of the shared content item, the information corresponding to the user device of the sharing user, the information corresponding to the user devices of the recipient users, and a conversation associated with the shared content item between the users. The token may be a small number of random characters used to index a table where the combination of information is maintained.

Lastly, at block 450, the shared content item and an invitation to join the conversation are provided to the recipient using the information corresponding to the user devices of the recipients. In one implementation, for any of the recipient users that are not logged-in to the content sharing platform, the invitation to join the conversation encourages the logged-out recipient users to sign-in or sign-up for a public profile in the content sharing platform by hiding comments of participating users in the conversation from the logged-out recipient users.

FIG. 5 is a flow diagram illustrating a method 500 for generating a conversation invitation for a logged-out sharing user of a content sharing platform according to an implementation of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by content sharing conversation system 140 as shown in FIGS. 1 and 2.

Method 500 begins at block 510 when an indication that a recipient user joined a conversation pertaining to a shared content item is received. The shared content item is shared by a sharing user that is not logged-in to a content sharing platform maintaining the shared content item. At block 520, a token associated with the conversation is accessed. Then, at block 530, information corresponding to a user device of the sharing user is determined from the token. In one implementation, the information corresponding to the user device of the sharing user may be a device ID, a visitor ID, or a cookie associated with the user device of the shared user (e.g., determined when the sharing user originally shared the content item).

Subsequently, at block 540, the information corresponding to the user device of the sharing user is utilized to determine a communication path to contact the user device of the sharing user. At block 550, a notification is provided to the user device via the determined communication path. In one implementation, the notification informs the sharing user that the recipient user has joined the conversation about the shared content item and invites the sharing user to join the conversation. Comments from other participating users in the conversation may be hidden from the sharing user as part of the notification. Lastly, at block 560, the user device of the sharing user is provided access to the conversation when the sharing user accepts the invitation to join the conversation. In on implementation, the sharing user accepts the invitation to join the conversation by signing-in or signing-up for a public profile on the content sharing platform.

Figure 6:
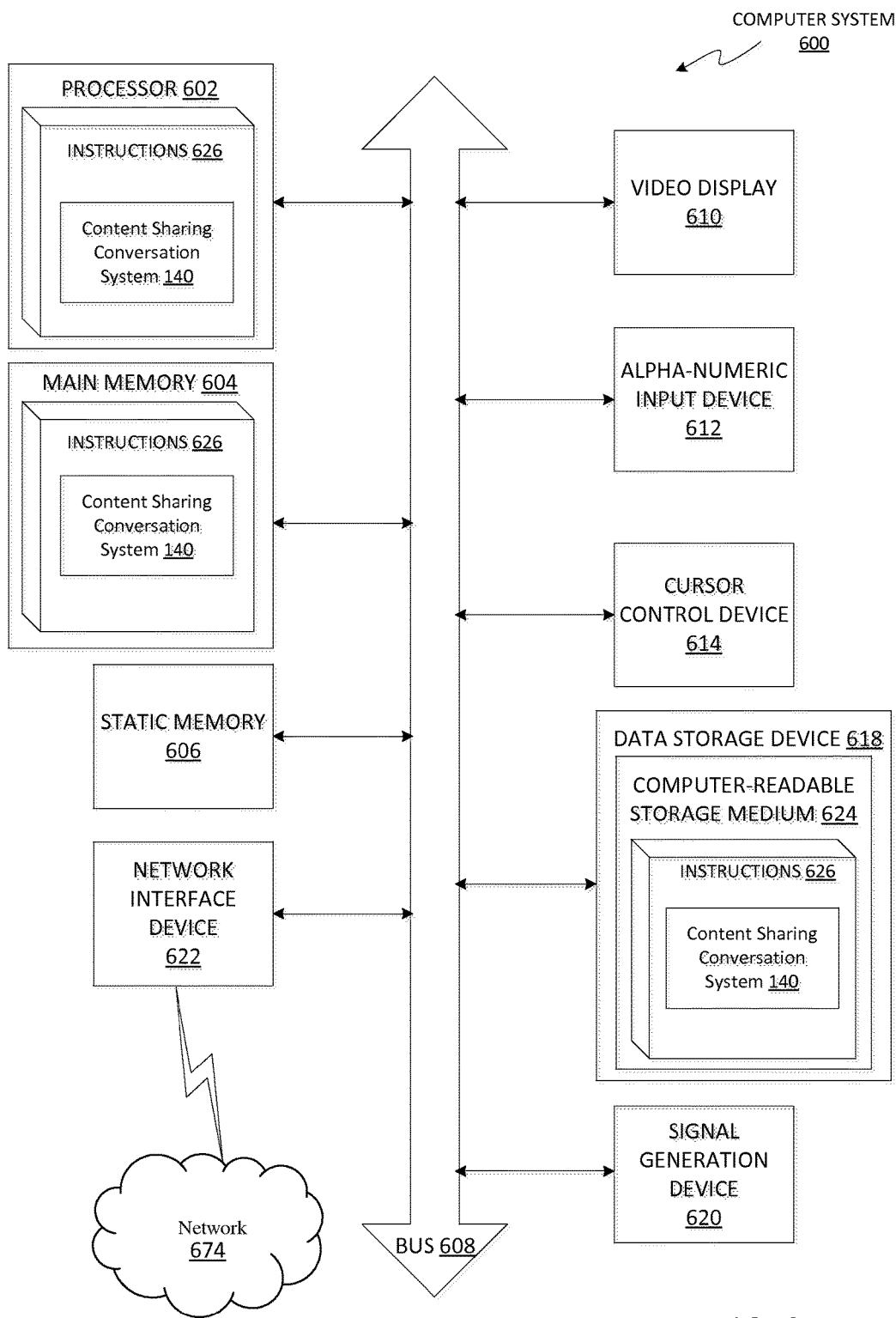
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server, such as server 102, executing a content sharing conversation system 140, as described with respect to FIGS. 1 and 2.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable storage medium 624 (also referred to as a machine-readable storage medium), on which is stored one or more set of instructions 626 (e.g., software) embodying any one or more of the methodologies of functions described herein. The instructions 626 may also reside, completely or at least partially, within the main memory 604 and/or within the processing device 602 during execution thereof by the computer system 600; the main memory 604 and the processing device 602 also constituting machine-readable storage media. The instructions 626 may further be transmitted or received over a network 674 via the network interface device 622.

The computer-readable storage medium 624 may also be used to store instructions to perform a method for generating logged-out conversation invitations, as described herein. While the computer-readable storage medium 624 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
    receiving, by a processing device, a first indication of a content item to be shared by a sharing user with one or more recipient users as part of a conversation, wherein the sharing user is not logged-in to a content sharing platform maintaining the content item;
    generating, by the processing device, a token comprising an object that represents a unique identifier to identify a combination of:
        a content item identifier of the content item,
        information corresponding to a user device of the sharing user,
        information corresponding to one or more user devices of the one or more recipient users, and
        a conversation identifier of the conversation associated with the content item;
    storing, by the processing device, the generated token and information pertaining to the combination identified by the token in a data store of the content sharing platform;
    sending, by the processing device, a link comprising the token to the one or more user devices of the one or more recipient users, the link providing access to the shared content item and a first invitation to join the conversation by logging-in to the content sharing platform;
    causing a conversation user interface (UI) to be created, based on the token, for the sharing user and the one or more recipient users, the conversation UI to represent a conversation space for the conversation that is provided to the one or more recipient users responsive to accessing the link;
    in response to receiving a second indication that a first recipient user of the one or more recipient users joined the conversation, determining the information corresponding to the user device of the sharing user from the token by accessing, in the data store, the token and the information pertaining to the combination identified by the token;
    determining a communication path based on the information pertaining to the combination identified by the token; and
    providing, to the user device of the sharing user via the communication path, a notification that the first recipient user joined the conversation and a second invitation to the sharing user to join the conversation by logging-in to the content sharing platform.

2. The method of claim 1, wherein logging-in to the content sharing platform comprises the one or more recipient users associating with a public identity on the content sharing platform.

3. The method of claim 1, wherein comments corresponding to the conversation are not shown in the conversation UI to the one or more recipient users who are not logged-in to the content sharing platform.

4. The method of claim 1, wherein the information corresponding to the user device of the sharing user comprises a device identifier (ID) of the user device of the sharing user.

5. The method of claim 1, wherein the information corresponding to the user device of the sharing user comprises a visitor identifier (ID) of the user device of the sharing user.

6. The method of claim 1, further comprising:
    providing, to the user device of the sharing user, access to the conversation via the conversation UI when another indication is received that the sharing user accepted the second invitation to join the conversation via logging-in to the content sharing platform.

7. The method of claim 6, wherein comments of the recipient user in the conversation are not shown in the conversation UI to the sharing user when the sharing user is not logged-in to the content sharing platform.

8. The method of claim 1, wherein a comment of the sharing user corresponding to the shared content item is provided with the shared content item when initially shared with the one or more recipients.

9. The method of claim 1, wherein the shared content item and the invitation to join the conversation are provided to the one or more recipient users via at least one of Short Message Service (SMS), email message, first-party network of the content sharing platform, or a third-party social network.

10. A client device comprising:
    a display device;
    a memory; and
    a processing device communicably coupled to the display device and the memory, wherein the processing device is to:
        receive, via a communication path established between the client device and a server device, a first notification;
        provide, via a user interface (UI) rendered on the display device, the first notification, wherein the first notification indicates that a recipient user has joined a conversation pertaining to a content item shared with the recipient user by a sharing user via the client device, wherein the sharing user is not logged-in to a content sharing platform maintaining the content item;

provide, via the UI, a first invitation to the sharing user to join the conversation, wherein the invitation comprises a token generated by the content sharing platform, the token comprising an object that represents a unique identifier to identify a combination of:
a content item identifier of the content item,
information corresponding to a user device of the sharing user,
information corresponding to user devices of the one or more recipient users, and
a conversation identifier of the conversation associated with the content item;
wherein the generated token and information pertaining to the combination identified by the token are stored in a data store of the content sharing platform; and
wherein the communication path is determined based on the information corresponding to the user device as obtained from the token and the information pertaining to the combination identified by the token;

receive, via the UI, a first indication of an affirmative action by the sharing user to join the conversation;

provide at least one of a log-in UI or an enrollment UI to the sharing user; and provide, via a conversation UI, access to the conversation when an indication is received that the sharing user is logged-in to the content sharing platform, the conversation UI to represent a conversation space for the conversation and is generated based on the token and the information pertaining to the combination identified by the token as accessed in the data store.

11. The client device of claim 10, wherein logging-in to the content sharing platform comprises the sharing users associating with a public identity on the content sharing platform.

12. The client device of claim 10, wherein comments corresponding to the conversation are not shown in the conversation UI to the sharing user when the sharing user is not logged-in to the content sharing platform.

13. The client device of claim 10, wherein the information corresponding to the user device of the sharing user comprises a device identifier (ID) of the user device of the sharing user.

14. The client device of claim 10, wherein the information corresponding to the user device of the sharing user comprises a visitor identifier (ID) of the user device of the sharing user.

15. A non-transitory machine-readable storage medium storing instructions which, when executed, cause a processing device to perform operations comprising:
receiving, by the processing device, a first indication of a content item to be shared by a sharing user with one or more recipient users as part of a conversation, wherein the sharing user is not logged-in to a content sharing platform maintaining the content item;
generating, by the processing device, a token comprising an object that represents a unique identifier to identify a combination of:
a content item identifier of the content item,
information corresponding to a user device of the sharing user,
information corresponding to one or more user devices of the one or more recipient users, and
a conversation identifier of the conversation associated with the content item;
storing, by the processing device, the generated token and information pertaining to the combination identified by the token in a data store of the content sharing platform;
sending, by the processing device, a link comprising the token to the one or more user devices of the one or more recipient users, the link providing access to the shared content item and a first invitation to join the conversation by logging-in to the content sharing platform;
causing a conversation user interface (UI) to be created, based on the token, for the sharing user and the one or more recipient users, the conversation UI to represent a conversation space for the conversation that is provided to the one or more recipient users responsive to accessing the link;
in response to receiving a second indication that a first recipient user of the one or more recipient users joined the conversation, determining the information corresponding to the user device of the sharing user from the token by accessing, in the data store, the token and the information pertaining to the combination identified by the token;
determining a communication path based on the information pertaining to the combination identified by the token; and
providing, to the user device of the sharing user via the communication path, a notification that the first recipient user joined the conversation and a second invitation to the sharing user to join the conversation by logging-in to the content sharing platform.

16. The non-transitory machine-readable storage medium of claim 15, wherein comments corresponding to the conversation are not shown in the conversation UI to the one or more recipient users who are not logged-in to the conversation.

17. The non-transitory machine-readable storage medium of claim 15, wherein the operations further comprising:
providing, to the user device of the sharing user, access to the conversation when another indication is received that the sharing user accepted the second invitation to join the conversation via logging-in to the content sharing platform, wherein comments of the recipient user in the conversation are not shown in the conversation UI to the sharing user when the sharing user is not logged-in to the content sharing platform.

18. The non-transitory machine-readable storage medium of claim 17,
wherein comments of the recipient user in the conversation are not shown in the conversation UI to the sharing user when the sharing user is not logged-in to the content sharing platform.

19. The non-transitory machine-readable storage medium of claim 15, wherein the shared content item and the invitation to join the conversation are provided to the one or more recipient users via at least one of Short Message Service (SMS), email message, first-party network of the content sharing platform, or a third-party social network.

* * * * *